United States Patent
Kikuchi et al.

(10) Patent No.: US 8,022,988 B2
(45) Date of Patent: Sep. 20, 2011

(54) DISPLAY APPARATUS AND COMPUTER PROGRAM

(75) Inventors: Hiroaki Kikuchi, Kanagawa (JP);
Yusuke Sugimoto, Kanagawa (JP);
Yukinori Noguchi, Kanagawa (JP);
Toshihiko Kaku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 2079 days.

(21) Appl. No.: 10/951,637

(22) Filed: Sep. 29, 2004

(65) Prior Publication Data

US 2005/0093977 A1    May 5, 2005

(30) Foreign Application Priority Data

Sep. 29, 2003  (JP) .................................. 2003-338704
Sep. 2, 2004   (JP) .................................. 2004-256338

(51) Int. Cl.
*H04N 7/18* (2006.01)

(52) U.S. Cl. ............... 348/157; 725/38; 725/42; 725/53

(58) Field of Classification Search .................. 348/157; 725/38, 42, 53
See application file for complete search history.

(56) References Cited

U.S. PATENT DOCUMENTS

| 4,831,438 | A  | * | 5/1989  | Bellman et al. ............... 348/148 |
| 5,600,368 | A  | * | 2/1997  | Matthews, III ............... 348/143 |
| 6,597,391 | B2 | * | 7/2003  | Hudson ......................... 348/153 |
| 6,810,526 | B1 | * | 10/2004 | Menard et al. .................. 725/46 |
| 7,143,434 | B1 | * | 11/2006 | Paek et al. ..................... 725/142 |
| 7,671,718 | B2 | * | 3/2010  | Turner et al. ................. 340/5.61 |
| 2005/0225634 | A1 | * | 10/2005 | Brunetti et al. ............... 348/143 |

FOREIGN PATENT DOCUMENTS

JP       3227350 B2    8/2001

\* cited by examiner

*Primary Examiner* — Tung Vo
*Assistant Examiner* — Anner Holder
(74) *Attorney, Agent, or Firm* — Sughrue Mion, PLLC

(57) ABSTRACT

A display apparatus includes an object recognizing unit for receiving a plurality of video channels and recognizing at least one object moving in the video channels, a display unit for displaying the plurality of video channels so that at east one of the objects recognized by the object recognizing unit is selectable, and if receiving a selection of an object, to which a user pays attention, displaying the video channel including the attention object as an attention object, considering the selected object as the attention object, a frame in and/or out detecting unit for detecting frame-out of the attention object out of the tracking video, and a video searching unit for searching other video channels using the attention object as a searching key if the frame-out of the attention object is detected and allowing the display unit to display the detected video channel.

19 Claims, 7 Drawing Sheets

VIDEO CHANNEL A

VIDEO CHANNEL B

VIDEO CHANNEL C

VIDEO CHANNEL D

DISPLAY APPARATUS AND COMPUTER PROGRAM

This patent application claims priority from Japanese patent applications Nos. 2004-256338 filed on Sep. 2, 2004, and 2003-338704 filed on Sep. 29, 2003, the contents of which are incorporated herein by reference.

BACKGROUND OF THE INVENTION

1. Field of the Invention

The present invention relates to a display apparatus and a computer program. More particularly, the present invention relates to a display apparatus for receiving video information including a plurality of images photographed from different positions with a plurality of cameras and selecting and displaying at least one of the plurality of images and a computer program for the display apparatus.

2. Description of the Related Art

When relay-broadcasting images in an event such as the Olympic games or car racing where there are many objects, a broadcast provider photographs the objects from different angles with a plurality of cameras at the same time and broadcasts one of the images to viewers via broadcast networks, changing over the images. In the prior art, Japanese Patent No. 3227350 discloses a technique of changing over reproduced images by a selection of one of different objects as a trigger, when reproducing a plurality of recording images obtained by photographing the objects from individual angles.

When there is a plurality of objects, interesting objects are different for each viewer. In this regard, the conventional television has a problem that it cannot properly display the different interesting objects for each viewer, because the images are switched over by the judgment of a program provider. Meanwhile, although the images from a plurality of angles with regard to one relay can be transmitted at the same time as the video information about a broadcast becomes digitalized and its bandwidth becomes a broadband, it is difficult for a viewer to change over the images. Moreover, the technique of changing over reproduced images by an object selection as a trigger is not suitable for video information about a broadcast in which the object frequently moves among a plurality of images.

SUMMARY OF THE INVENTION

Therefore, it is an object of the present invention to provide a display apparatus and a computer program, which is capable of overcoming the above drawbacks accompanying the conventional art. The above and other objects can be achieved by combinations described in the independent claims. The dependent claims define further advantageous and exemplary combinations of the present invention.

According to a first aspect of the present invention, a display apparatus for receiving video information including a plurality of video channels photographed from different positions with a plurality of cameras and selecting and displaying at least one of the plurality of video channels, includes an object recognizing unit for receiving the plurality of video channels and recognizing at least one object moving in the video channels, a display unit for displaying the plurality of video channels so that at least one of the objects recognized by the object recognizing unit is selectable and receiving a selection of an object, to which a user pays attention, considering the object selected as an attention object, a video searching unit for searching the plurality of video channels using the attention object received by the display unit as a searching key and allowing the display unit to display one of the video channels, which includes the attention object, as a tracking video prior to other video channels, and a frame-out detecting unit for detecting frame-out of the attention object out of the tracking video, wherein if the frame-out detecting unit detects the frame-out of the attention object, the video searching unit searches other video channels using the attention object as a searching key and allows the display unit to display one of the video channels searched as the tracking video.

The display apparatus may further include a frame-in detecting unit for detecting frame-in of a display prohibition object into a filtered video, wherein the display unit may receive a selection of an object, which a user does not desire to see, considering the object selected as the display prohibition object, the video searching unit may search the plurality of video channels using the display prohibition object received by the display unit as a searching key and allow the display unit to display one of the video channels, which does not include the display prohibition object, as the filtered video prior to other video channels, and if the frame-in detecting unit detects the frame-in of the display prohibition object, the video searching unit may search other video channels using the display prohibition object as a searching key and allow the display unit to display one of the video channels, which does not include the display prohibition object, as the filtered video.

The frame-in detecting unit may detect frame-in of the display prohibition object into the filtered video with regard to a range outside the filtered video displayed by the display unit.

The frame-out detecting unit may detect whether or not the attention object is positioned out of a frame, which is set inside a display range of the tracking video with regard to the display unit.

The display apparatus may further include a video preserving unit for preserving the plurality of video channels, after recording a timing at which the attention object is shown, for each of the plurality of video channels, wherein the display unit may retrieve the timing recorded in the video preserving unit and sequentially select and reproduce one of the plurality of video channels showing the attention object.

The display unit may reproduce the video channels with a predetermined time lag from the time of receiving the video information, and if no video channels show the attention object during reproduction, the display unit may select and reproduce one of the video channels to show the attention object next time, using information obtained by retrieving the timing.

The display unit may attach an identifier to each of the objects recognized by the object recognizing unit to display the object and receive an input of the identifier as the selection of the object.

The display unit may overlap the tracking video onto an area, which is a part of one of the plurality of video channels attached with a voice comment, and display the tracking video to be smaller than the video channel attached with the voice comment.

If the attention object is shown in at least two of the video channels at the same time, the display unit may select and display one of the video channels, in which the size of the object is larger than other video channels.

If the attention object is shown in at least two of the video channels at the same time, the display unit may select and display one of the video channels, in which the position of the object is closer to a centre than other video channels.

If the attention object is shown in at least two of the video channels at the same time, the display unit may select and display one of the video channels, in which the object faces a front relatively to other video channels.

Priority may be given to each of the plurality of video channels in advance, and if the attention object is shown in at least two of the video channels at the same time, the splay unit may select and display one of the video channels, in which the priority is high.

The video searching unit may regularly evaluate each of the video channels with a plurality of evaluation items, and if the frame-out detecting unit detects the frame-out of the attention object, the video searching unit may display one of the video channels, in which a total value of the evaluation items is high, prior to other video channels.

The video information may be a broadcast.

According to a second aspect of the present invention, a display apparatus includes a video preserving unit for preserving a plurality of video channels, an object recognizing unit for receiving the plurality of video channels from the video preserving unit and recognizing at least one object moving in the video channels, a display unit for displaying the plurality of video channels so that at least one of the objects recognized by the object recognizing unit is selectable, and if receiving a selection of an object, displaying one of the video channels including an attention object, to which a user pays attention, as a tracking video prior to other video channels, a frame-out detecting unit for detecting frame-out of the attention object out of the tracking video and a video searching unit for searching other video channels using the attention object as a searching key if the frame-out of the attention object is detected, and allowing the display unit to display one of the video channels searched as the tracking video.

According to a third aspect of the present invention, a computer program for a display apparatus for receiving video information including a plurality of video images photographed from different positions with a plurality of cameras and selecting and displaying at least one of the plurality of video images, the computer program including computer-readable instructions for allowing the display apparatus to realize an object recognizing function for receiving the plurality of video images and recognizing at least one object moving in the video images, a display function for displaying the plurality of video images so that at least one of the objects recognized by the object recognizing function is selectable, and if receiving a selection of an object, displaying one of the video images including an attention object, to which a user pays attention, as a tracking video prior to other video images, a frame-out detecting function for detecting frame-out of the attention object out of the tracking video and a video searching function for searching other video images using the attention object as a searching key if the frame-out of the attention object is detected, and allowing the display apparatus to display one of the video images searched as the tracking video.

According to a third aspect of the present invention, a computer program for a display apparatus for retrieving and displaying one of a plurality of video channels, which is preserved in a video preserving unit, the computer program including computer-readable instructions for allowing the display apparatus to realize an object recognizing function for receiving the plurality of video channels from the video preserving unit and recognizing at least one object included in the video channels retrieved, a display function for displaying the plurality of video channels so that at least one of the objects recognized by the object recognizing function is selectable, and if receiving a selection of an object, displaying one of the video channels including an attention object, to which a user pays attention, as a tracking video prior to other video channels, a frame-out detecting function for detecting frame-out of the attention object out of the tracking video and a video searching function for searching other video channels using the attention object as a searching key if the frame-out of the attention object is detected, and allowing the display apparatus to display one of the video channels searched as the tracking video.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
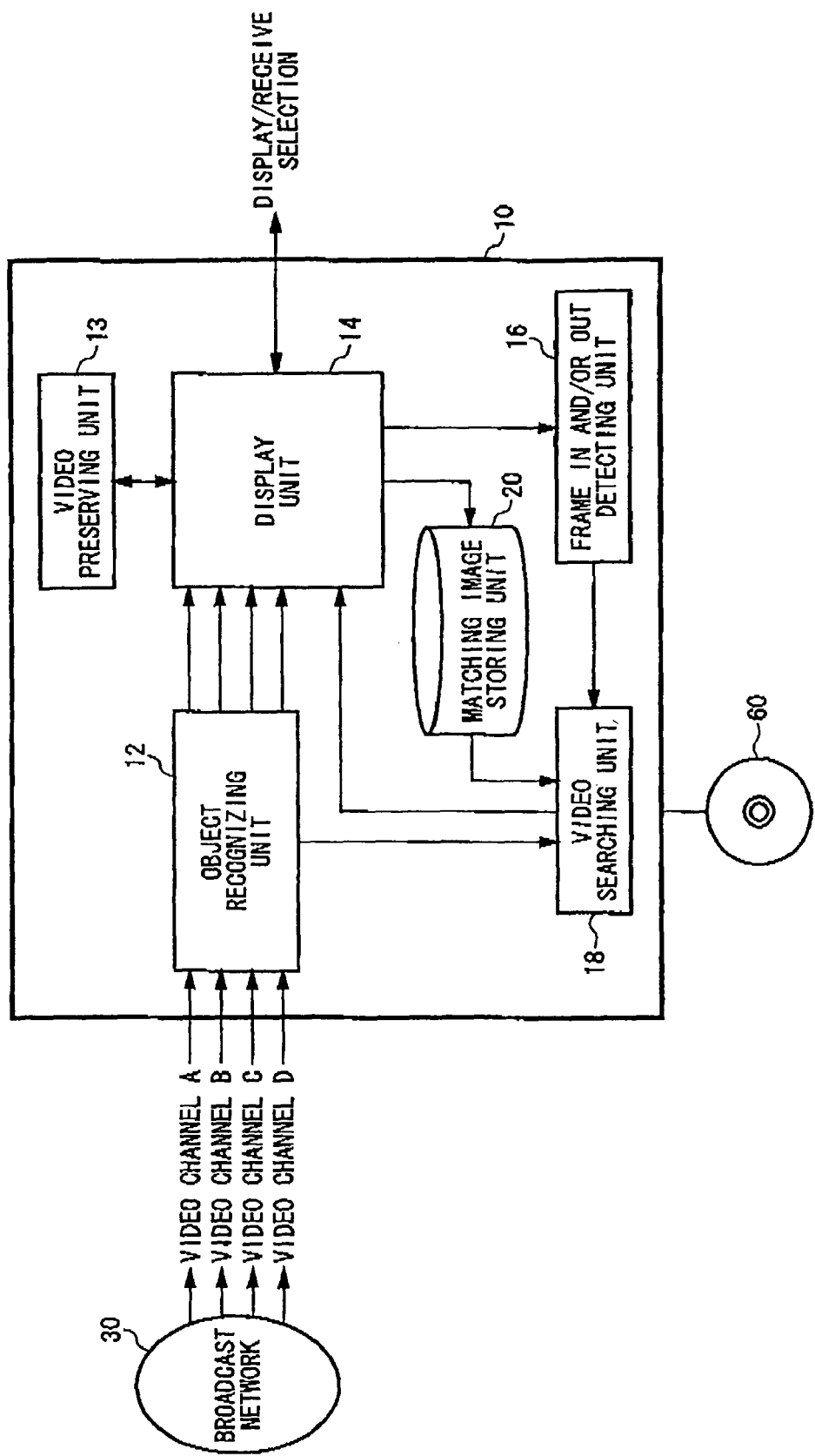
FIG. 1 shows a block diagram of a first embodiment of the functional configuration of a display apparatus 10.

FIG. 1 shows a first embodiment of the functional configuration of a display apparatus 10 of this invention. The display apparatus 10 of this embodiment has the feature of photographing objects from different angles with regard to the same program, sequentially selecting a plurality of video channels (A, B, C and D) obtained by photographing the objects to show some of the objects, to which viewers pay attention, best and displaying the channel as a "tracking video". The display apparatus 10 is, for example, a digital television or a personal computer. The broadcast including a plurality of video channels in one program is an example of video information of this invention. Moreover, the video channel is an example of the video of this invention.

The display apparatus 10 includes, as its functional configuration, an object recognizing unit 12 for recognizing a moving object included in each of a plurality of video channels (A, B, C and D), a display unit 14 for displaying at least some of the plurality of video channels and receiving a selection of an object from a viewer, a frame in and/or out detecting unit 16 for detecting the frame-out of an object selected as an image, to which the viewer pays attention (hereafter, referred to as an attention object), out of the tracking video, and a video searching unit 18 for searching other video channels showing the attention object, considering the frame-out of the attention object out of the tracking video as a trigger.

The display apparatus 10 further includes a video preserving unit 13 for preserving a plurality of video channels (A, B, C and D) input to the display unit 14 and a matching image storing unit 20 for preserving the characteristics, that is, the shape, color, etc., about the appearance of the attention object, of which the selection has been received by the display unit 14, as a matching image for video searching performed by the video searching unit 18.

The video preserving unit 13 preserves each of the plurality of video channels (A, B, C and D) after recording the timing when the attention object is shown. The timing when the attention object is shown is, for example, a counter value of the video from the frame-in to the frame-out of the attention object. The display unit 14 may retrieve the timing when the attention object is to be shown from the video preserving unit 13 with regard to each of the plurality of video channels and switch over the video channels to display the tracking video based on the timing retrieved.

Moreover, if the display unit 14 receives a selection of an object which a user does not desire to see, it considers the object selected as a display prohibition object. The video searching unit 18 searches a plurality of video channels, using the display prohibition object received by the display unit 14 as a searching key, and allows the display unit 14 to display a video channel not including the display prohibition object prior to others as a filtered video. In addition, the frame in and/or out detecting unit 16 detects the frame-in of the display prohibition object into the filtered video. If the frame in and/or out detecting unit 16 detects the frame-in of the display prohibition object, the video searching unit 18 searches other video channels, using the display prohibition object as a searching key, and allows the display unit 14 to display the video channel not including the display prohibition object as the filtered video. Accordingly, the display apparatus 10 can simultaneously select and display the video channel including the attention object but the display prohibition object.

It is preferable that the display unit 14 displays the filtered video within a range less than the maximum range of the image of each video channel. Moreover, the frame in and/or out detecting unit 16 detects the frame-in of the display prohibition object into the filtered video with regard to a range outside the range of the filtered video displayed by the display unit 14. Accordingly, the frame in and/or out detecting unit 16 can detect the frame-in into the filtered video, before the display prohibition object is displayed by the display unit 14. Therefore, it is possible to change over video channels before the display prohibition object is displayed by the display unit 14.

The recording medium 60 stores a computer program for allowing display apparatus 10 to realize the functions of the object recognizing unit 12, the video preserving unit 13, the display unit 14, the frame in and/or out detecting unit 16, the video searching unit 18, and the matching image storing unit 20. The display apparatus 10 may execute the above computer program via a network.

According to the configuration above, when the attention object moves among the plurality of video channels (A, B, C and D) one after another, the display apparatus 10 can display the tracking video of the attention object by selecting and displaying the video channels showing the attention object one after another on a screen. That is, the display apparatus 10 can select and display the plurality of video channels one after another according to the object desired by viewers.

Figure 2:
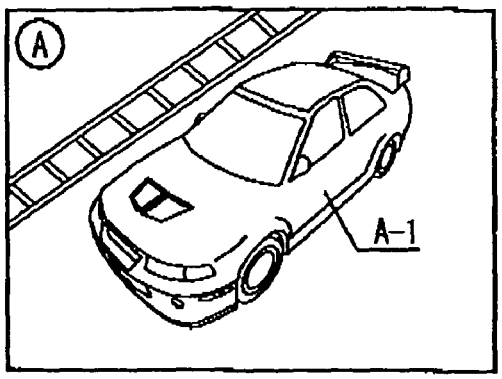
FIG. 2 shows an example of the plurality of video channels.
Figure 2:
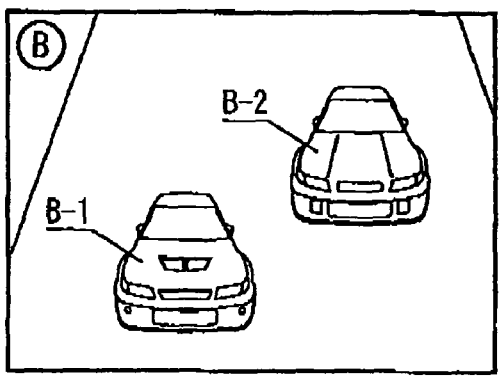
Figure 2:
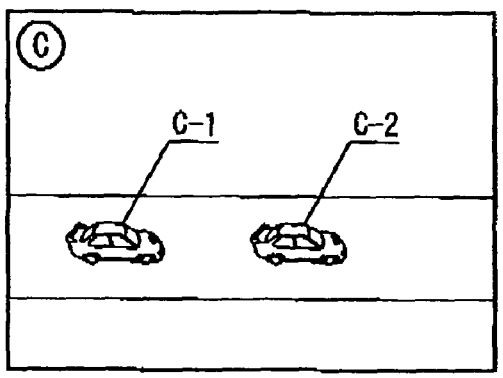
Figure 2:

FIG. 2 shows an example of the plurality of video channels. The display apparatus 10 in this embodiment receives the video information including video channels A, B, C and D obtained by photographing car racing views from a plurality of different camera positions. The object recognizing unit 12 recognizes a moving object included in each of the video channels. If a plurality of objects is included in one of the video channels at the same time, the objects are individually recognized. Further, whether the object is moving or not can be determined by dividing the video image into a background and an object and judging whether the position of the object against the background continuously changes or not. For example, in the video channel D that shows the video of spectator seats, the positions of the spectators do not continuously change against the background. Therefore, the object recognizing unit 12 does not mistake the spectators as the moving object.

The display unit 14 attaches an identifier to each of the objects recognized by the object recognizing unit 12 to displays it. The identifiers are, for example, A-1, B-1, . . . , C-2, etc. shown in FIG. 2. The display unit 14 receives an input of the identifier as the object selection. The identifier is input via a remote controller or a mouse. Moreover, if only one object recognized is included in one video channel, the display unit 14 may receive a selection of the concerned video channel as the object selection.

The display unit 14 receives the object selection in accordance with the above procedure for each of the plurality of video channels. The display apparatus 10 recognizes the object selected in each of the video channels as an identical attention object photographed from different angles. For example, if selecting A-1 in the video channel A, B-2 in the video channel B and C-1 in the video channel C, the display apparatus 10 recognizes A-1, B-2, and C-1 as the identical attention object. In this process, the display apparatus 10 obtains the characteristics, i.e., the shape, color, etc., of the appearance of the attention object from a plurality of different angles and stores them in the matching image storing unit 20.

Figure 3:
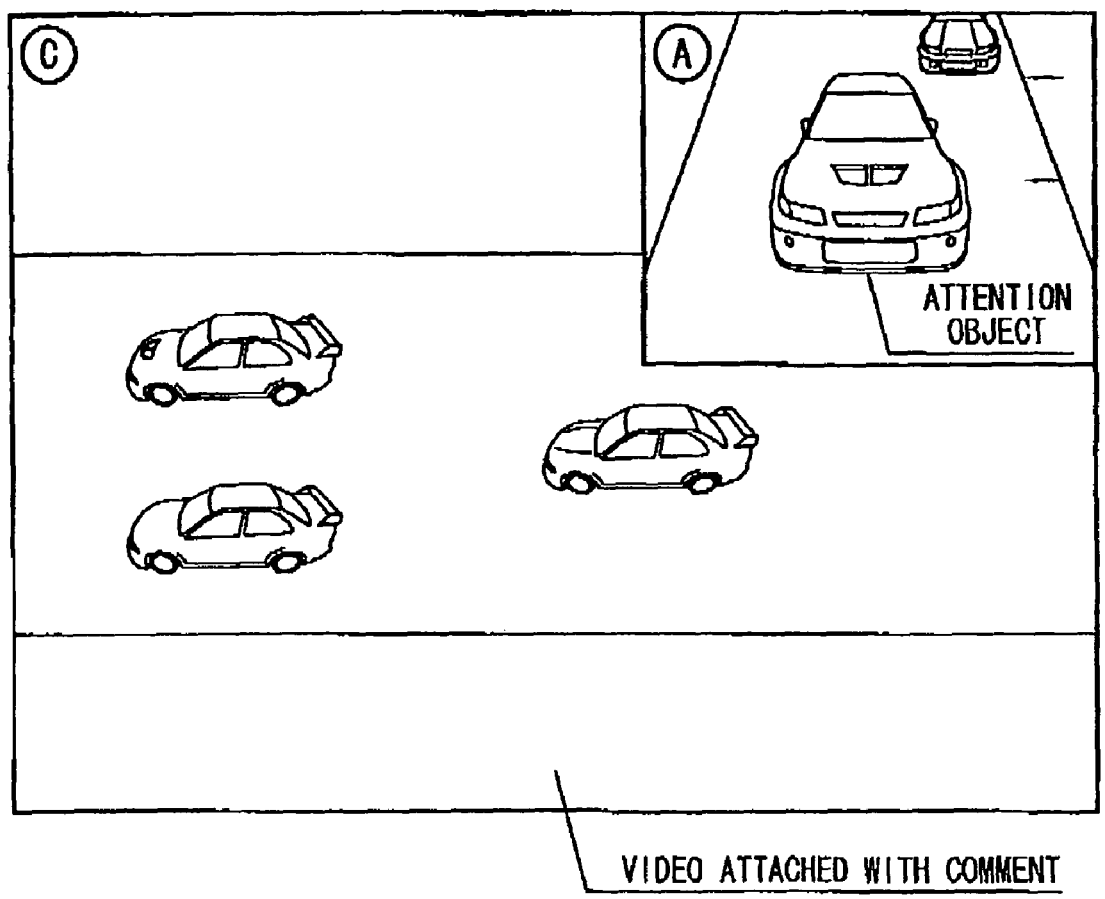
FIG. 3 shows an example of an object displayed by a display unit 14 after the object selection.

FIG. 3 shows an example of an object displayed by the display unit 14 after the object selection. The display unit 14 overlaps the tracking video onto an area which is a part of an image attached with a voice comment (hereafter, referred to as a "video attached with comment") among the plurality of video channels and displays it to be smaller than the video attached with comment. Hereafter, the display area of the video attached with comment will be called a main screen, and the display area of the tracking video overlapped and displayed upon the partial area of the main screen is called a sub-screen. In this embodiment shown in FIG. 3, the video channel C is displayed on the main screen, and the video channel A is displayed on the sub-screen.

The display unit 14 may attach an identifier such as "attention object" to the object recognized as the attention object on the sub-screen to display it. In case of the frame-out of the attention object shown on the sub-screen out of the video channel A, another video channel showing the attention object is displayed on the sub-screen in place of the video channel A.

Figure 4:
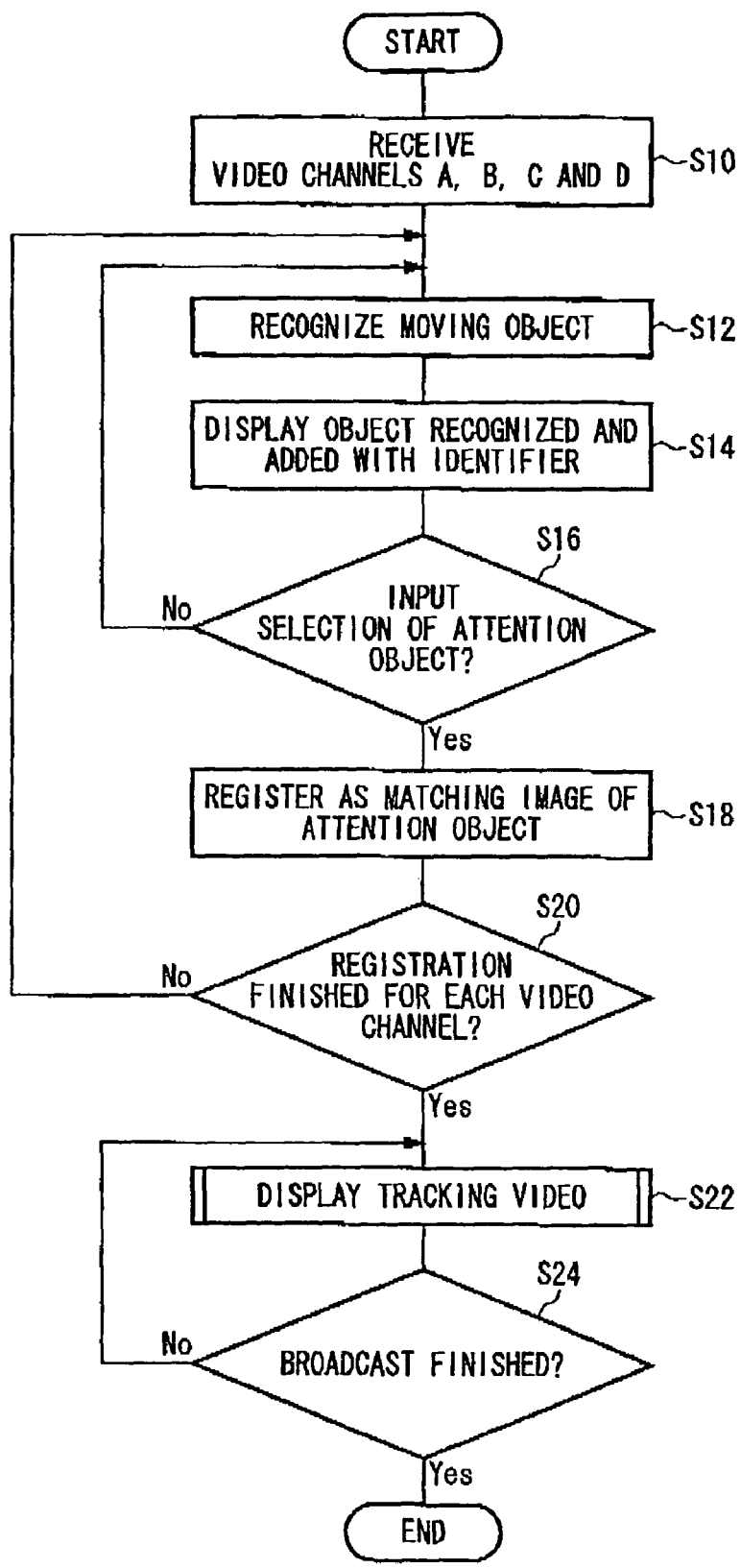
FIG. 4 shows a flowchart of the display apparatus 10 displaying a tracking video.

FIG. 4 shows an example of the processes of the display apparatus 10 displaying the tracking video. First, the object recognizing unit 12 receives a plurality of video channels A, B, C and D, which is obtained by photographing objects from different angels, from a broadcast network 30 (S10). Next, the object recognizing unit 12 recognizes a moving object for each of the video channels (S12). At this time, the object recognizing unit 12 recognizes an object, of which the motion vector against the background video is larger than a predetermined reference value, as the moving object.

Next, the display unit 14 attaches an identifier to each of the objects recognized by the object recognizing unit 12 so that the objects is selectable (S14). At this time, the display unit 14 may display the plurality of video channels A, B, C and D side by side on the screen or sequentially display the video channels one after another. Then, the display unit 14 judges whether the object is selected for each of the video channels (S16). The object selection is an input of the identifier using a remote controller, a mouse, etc. If only one object selectable is shown on the video channel, the selection of the video channel may be received as the object selection.

If there is no object selection (S16: No), the process returns to the step 12. On the other hand, if a selection of an object is received (S16: Yes), the display unit 14 registers the image selected into the matching image storing unit 20 as the matching image of the attention object (S18). Then, the display apparatus 10 confirms whether the registration of the matching image is finished or not for each of the video channels (S20).

In this case, the display apparatus 10 judges whether or not the registration of matching images is finished under a condition that the matching images for all of the video channels are registered. Further, the video channel not showing the object to be selected may be considered as an exception of the registration of matching images according to the decision of a viewer. If it is judged that the registration of matching images has not been finished in the step 20 (S20: No), the process returns to the step 12, and the object selection will be received again.

Meanwhile, if it is judged that the registration of matching image has been finished (S20: Yes), the display unit 14 displays the tracking video of the attention object by selecting and displaying the video channels showing the attention object one after another on a screen (S22). The step 22 will be described in detail in connection with FIG. 5. Next, the display apparatus 10 judges whether the broadcast is finished or not (S24). If the display apparatus 10 judges that the broadcast is not finished (S24: No), it returns to the step 22 and displays the tracking video. On the other hand, if it judges that the broadcast has been finished (S24: Yes), it finishes the display of the tracking video and the process is finished.

Figure 5:
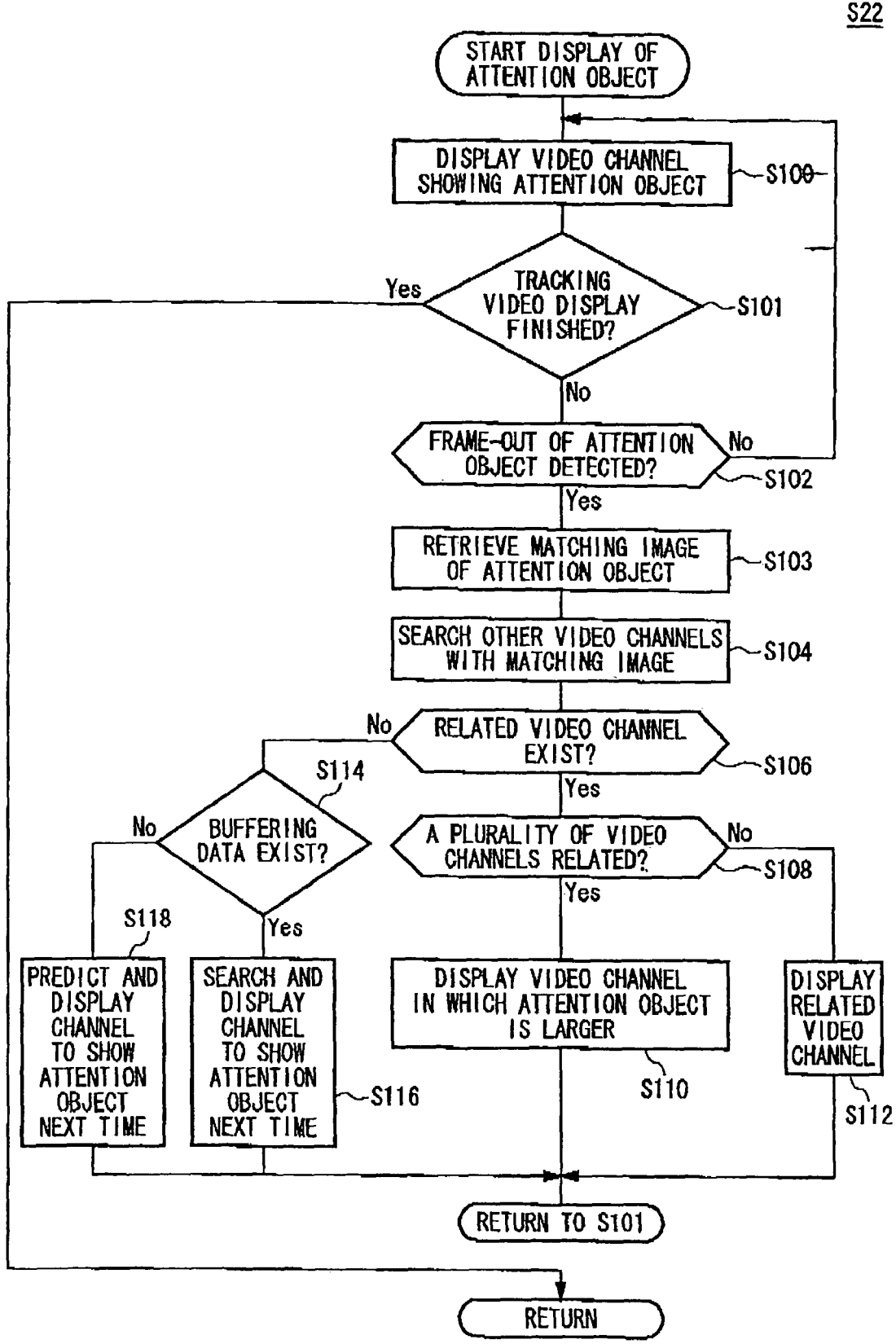
FIG. 5 shows the step 22 with regard to FIG. 4 in detail.

FIG. 5 shows the step 22 (the display of the tracking video) with regard to FIG. 4 in detail. First, the display unit 14 displays the video channel showing the attention object as the tracking video (S100). At this time, if the attention object is shown in a plurality of video channels at the same time, the display unit 14 allows a viewer to select one of the video channels to be displayed. Alternatively, it may display one of the video channels showing the attention object more largely prior to others.

Next, the display unit 14 judges whether an end command of the tracking video is inputted or not (S101). If the display unit 14 judges that the end command of the tracking video is inputted (S101: Yes), the step 22 is finished. On the other hand, if the display unit 14 judges that the end command of the tracking video is not inputted (S101: No), the frame in and/or out detecting unit 16 judges whether the frame-out of the attention object out of the tracking video happens (S102). If the frame-out of the attention object does not happen (S102: No), the process returns to the step 100, and the same video channel as so far is displayed.

On the other hand, if the frame-out of the attention object happens (S102; Yes), the video searching unit 18 retrieves a matching image of the concerned attention object from the matching image storing unit 20 (S103). At this time, the video searching unit 18 retrieves the matching image of the attention object for each of the plurality of video channels. Then, the video searching unit 18 searches other video channels with the matching image retrieved from the matching image storing unit 20 (S104). For example, the video searching unit 18 matches the object recognized by the object recognizing unit 12 with the matching image for each of the video channels. The video searching unit 18 informs the display unit 14 of the search result.

The display unit 14 judges whether or not there is a video channel including the attention object, based on the searching result received from the video searching unit 18 (S106). It the display unit 14 judges that there is a video channel including the attention object (S106: Yes), it judges whether a plurality of video channels is concerned or not (S108). If the number of the concerned video channels is not plural, i.e., only one video channel includes the attention object (S106: No) the display unit 14 displays the concerned video channel as the tracking video (S112). Then, the process returns to the step 101.

In the step 108, if it is judged that a plurality of video channels are concerned (S108: Yes), the video searching unit 18 displays a video channel, in which the attention object is larger than others, prior to others (S10). Alternatively, the video searching unit 18 may display a video channel, in which the position of the attention object is closer to the centre or the attention object relatively faces the front, prior to others. In this case, it is preferable that the direction of the front of the attention object is registered when the matching image is registered in the step 18. Priority may be given to a plurality of video channels in advance, so that the display unit 14 displays a video channel, of which the priority given in advance is high, prior to others.

Further, the video searching unit 18 may regularly evaluate each of the video channels with a plurality of evaluation items and display a video channel, of which the evaluation point is high, prior to others. The evaluation items are the size of the attention object, the distance from the centre of the screen to the attention object, the direction of the attention object, the time during which the attention object is kept being shown, etc. For example, the larger the attention object shown on a video channel is, the higher the evaluation point to be given is. The closer to the centre of the screen the position of the attention object shown on a video channel is, the higher the evaluation point to be given is. Moreover, the longer the attention object is kept being shown on a video channel is, the higher the evaluation point to be given is. The display unit 14 may set different weights for each evaluation item. The video searching unit 18 renews each evaluation item regularly, for example, every 0.1 second. It the frame in and/or out detecting unit 16 detects the frame-out of the attention object, the video searching unit 18 displays a video channel, of which the total point of the evaluation items is high, prior to others.

On the other hand, in the step 106, if there is no video channel including the attention object, i.e., it is judged that the attention object is moving in a position where it cannot be photographed in any video channels (S106: No), the display apparatus 10 judges whether or not there is prepared buffering data related to the next video (S114). When a video later than the real time relay by a predetermined time lag is displayed, the buffering data related to the next video may be retrieved from the video preserving unit 13 or obtained via the broadcast network 30 before displaying the video.

If the buffering data exits (S114: Yes), the video searching unit 18 searches the buffering data for the next video with the matching image of the attention object and informs the display unit 14 of the video channel to show the attention object next time. The display unit 14 displays the informed video channel (S116). Then, the process returns to the step 101. On the other hand, if the buffering data does not exists (S114: No), the display unit 14 predicts and displays a video channel, of which the photograph range is positioned in the direction of the frame-out of the attention object, as the video channel to show the attention object next time (S118). Then, the process returns to the step 101.

According to the operation processes above, the display apparatus 10 can display the tracking video of the attention object by selecting a plurality of video channels showing an attention object one after another and displaying them on a screen, when the attention object is moving among the video channels one after another. That is, the display apparatus 10 can select and display one of the video channels one after another according to the object which a viewer desires to see.

Figure 6:
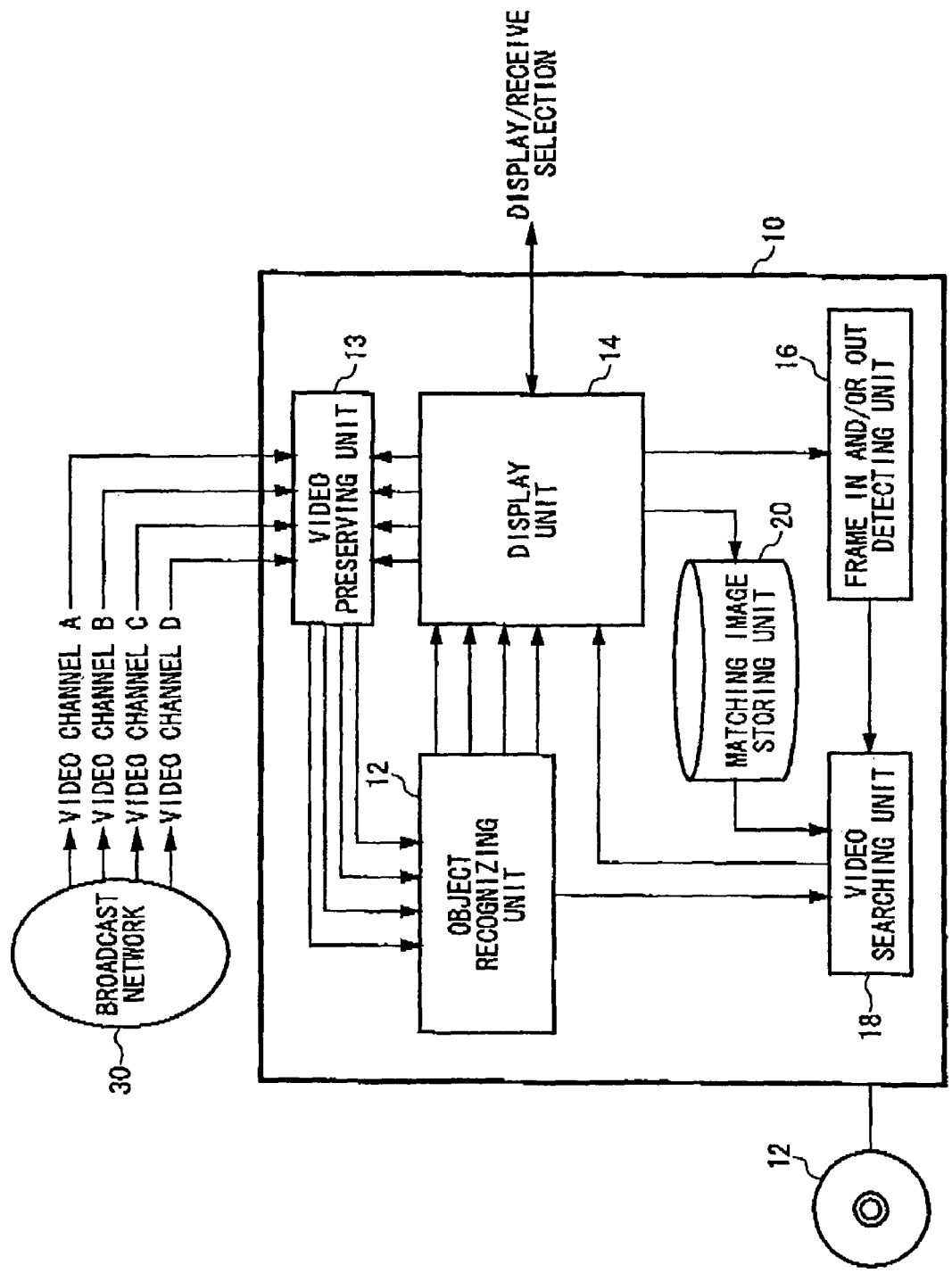
FIG. 6 shows a block diagram of another embodiment of the functional configuration of a display apparatus 10.

FIG. 6 shows a second embodiment of the functional configuration of a display apparatus 10. Moreover, the matters the same as those in the first embodiment are given the same reference numerals and will not be described. The video preserving unit 13 of this embodiment is, for example, a hard disk recorder. The video preserving unit 13 receives a plurality of video channels (A, B, C and D) obtained by photographing objects from different angles via the broadcast network 30 and records it independently for each video channel. The object recognizing unit 12 retrieves the plurality of video channels from the video preserving unit 13 at the same time and recognizes a moving object included in the video channels retrieved. The following operation and configuration are the same as those of the first embodiment. That is, when the display unit 14 displays the plurality of video channels so that any of the objects recognized by the object recognizing unit 12 can be selectable and receives a selection of an object, it displays a video channel including the attention object as the tracking video prior to others. The frame in and/or out detecting unit 16 detects whether or not the framer out of the attention object out of the tracking video happens. If the frame-out of the attention object is detected, the video searching unit 18 searches other video channels using the attention object as a searching key and allows the display unit 14 to display the video detected as the tracking video. According to the display apparatus 10, it is possible to select and display video channels including an attention object, which a viewer desires to see, from a multi-channel video preserved in the video preserving unit 13 one after another. The recording medium 60 stores a computer program for allowing the display apparatus 10 to realizing the functions of the object recognizing unit 12, the video preserving unit 13, the display unit 14, the frame in and/or out detecting unit 16, the video searching unit 18, and the matching image storing unit 20 related to the embodiments of this invention. The display apparatus 10 may execute the computer program obtained via networks.

Figure 7:
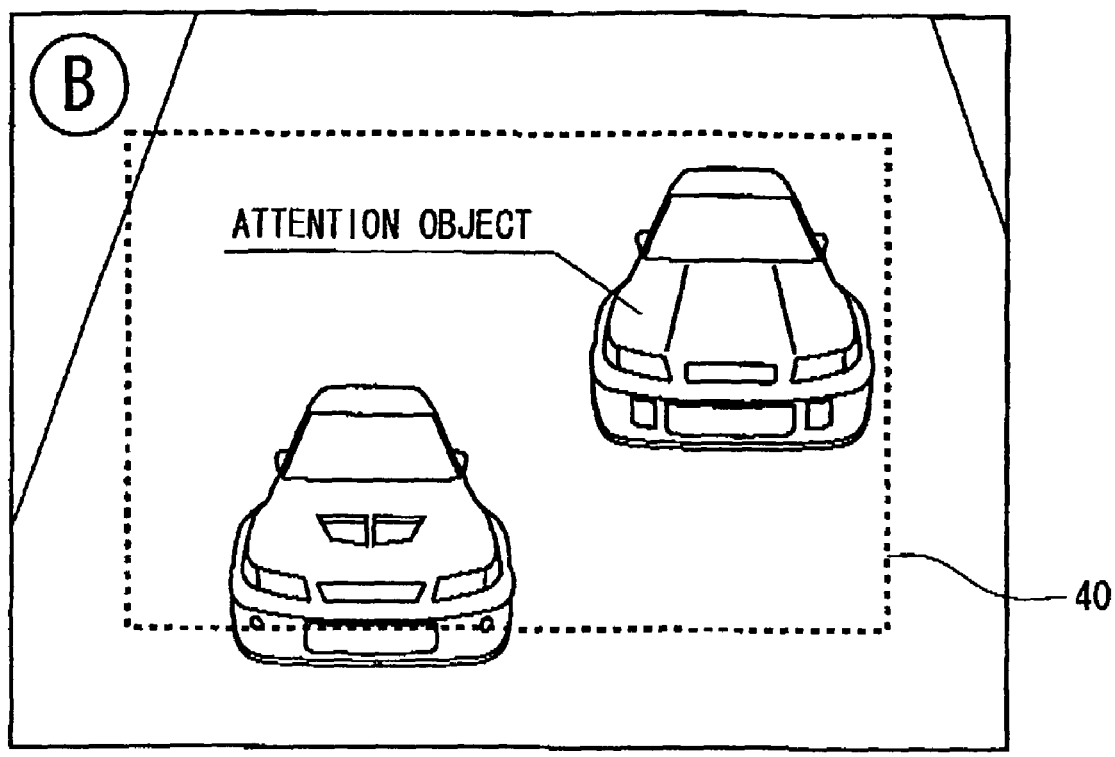
FIG. 7 shows a frame set inside the display range.

FIG. 7 shows a frame 40 set inside the display range of the tracking video in the display unit. The size of the frame 40 may be determined by a user. The frame in and/or out detecting unit 16 detects whether or not the attention object is positioned out of the frame 40. Therefore, the video searching unit 18 can switch over video channels exactly before the attention object is positioned out of the frame 40.

Although the present invention has been described by way of exemplary embodiments, it should be understood that those skilled in the art might make many changes and substitutions without departing from the spirit and the scope of the present invention which is defined only by the appended claims.

What is claimed is:

1. A display apparatus for receiving video information including a plurality of video channels and selecting and displaying at least one of said plurality of video channels, compressing:

an object recognizing unit for receiving a plurality of video channels which are photographed from different positions or angles in an event with a plurality of cameras and recognizing at least one object moving in said video channels;

a display unit for displaying said plurality of video channels so that at least one of said objects recognized by said object recognizing unit is selectable and receiving a selection of an object, to which a user pays attention, considering said object selected as an attention object;

a video searching unit for searching said plurality of video channels using said attention object received by said display unit as a searching key and allowing said display unit to display one of said video channels, which includes said attention object, as a tracking video prior to other video channels; and a frame-out detecting unit for detecting frame-out of said attention object out of said tracking video, wherein if said frame-out detecting unit detects said frame-out of said attention object, said video searching unit searches other video channels using said attention object as a searching key and allows said display unit to display one of said video channels searched as said tracking video.

2. A display apparatus as claimed in claim 1, further comprising a frame-in detecting unit for detecting frame-in of a display prohibition object into a filtered video, wherein said display unit receives a selection of an object, which a user does not desire to see, considering said object selected as said display prohibition object, said video searching unit searches said plurality of video channels using said display prohibition object received by said display unit as a searching key and allows said display unit to display one of said video channels, which does not include said display prohibition object, as said filtered video-prior to other video channels, and if said frame-in detecting unit detects said frame-in of said display prohibition object, said video searching unit searches other video channels using said display prohibition object as a searching key and allows said display unit to display one of said video channels, which does not include said display prohibition object, as said filtered video.

3. A display apparatus as claimed in claim 2, wherein said frame-in detecting unit detects frame-in of said display prohibition object into said filtered video with regard to a range outside said filtered video displayed by said display unit.

4. A display apparatus as claimed in claim 1, wherein said frame-out detecting unit detects whether or not said attention object is positioned out of a frame, which is set inside a display range of said tracking video with regard to said display unit.

5. A display apparatus as claimed in claim 1, further comprising a video preserving unit for preserving said plurality of video channels, after recording a timing at which said attention object is shown, for each of said plurality of video channels, wherein said display unit retrieves said timing recorded in said video preserving unit and sequentially selects and reproduces one of said plurality of video channels showing said attention object.

6. A display apparatus as claimed in claim 5, wherein said display unit reproduces said video channels with a predetermined time lag from the time of receiving said video information, and if no video channels show said attention object during reproduction, said display unit selects and reproduces one of said video channels to show said attention object next time, using information obtained by retrieving said timing.

7. A display apparatus as claimed in claim 1, wherein said display unit attaches an identifier to each of said objects recognized by said object recognizing unit to display said object and receives an input of said identifier as said selection of said object.

8. A display apparatus as claimed in claim 1, wherein said display unit overlaps said tracking video onto an area, which is a part of one of said plurality of video channels attached with a voice comment, and displays said tracking video to be smaller than said video channel attached with said voice comment.

9. A display apparatus as claimed in claim 1, wherein if said attention object is shown in at least two of said video channels at the same time, said display unit selects and displays one of said video channels, in which the size of said object is larger than other video channels.

10. A display apparatus as claimed in claim 1, wherein if said attention object is shown in at least two of said video channels at the same time, said display unit selects and displays one of said video channels, in which the position of said object is closer to a centre than other video channels.

11. A display apparatus as claimed in claim 1, wherein if said attention object is shown in at least two of said video channels at the same time, said display unit selects and displays one of said video channels, in which said object faces a front relatively to other video channels.

12. A display apparatus as claimed in claim 1, wherein priority is given to each of said plurality of video channels in advance, and if said attention object is shown in at least two of said video channels at the same time, said display unit selects and displays one of said video channels, in which said priority is high.

13. A display apparatus as claimed in claim 1, wherein said video searching unit regularly evaluates each of said video channels with a plurality of evaluation items, and if said frame-out detecting unit detects said frame-out of said attention object, said video searching unit displays one of said video channels, in which a total value of said evaluation items is high, prior to other video channels.

14. A display apparatus as claimed in claim 1, wherein said video information is a broadcast.

15. A display apparatus comprising:
a video preserving unit for preserving a plurality of video channels which are photographed from different positions or angles in an event with a plurality of cameras;
an object recognizing unit for receiving said plurality of video channels from said video preserving unit and recognizing at least one object moving in said video channels;
a display unit for displaying said plurality of video channels so that at least one of said objects recognized by said object recognizing unit is selectable, and if receiving a selection of an object, displaying one of said video channels including an attention object, to which a user pays attention, as a tracking video prior to other video channels;
a frame-out detecting unit for detecting frame-out of said attention object out of said tracking video; and
a video searching unit for searching other video channels using said attention object as a searching key if said frame-out of said attention object is detected, and allowing said display unit to display one of said video channels searched as said tracking video.

16. A non-transitory computer readable medium storing thereon a program for a display apparatus for receiving video information including a plurality of video images and selecting and displaying at least one of said plurality of video images, said program comprising computer-readable instructions for allowing said display apparatus to realize:
an object recognizing function for receiving said plurality of video images which are photographed from different positions or angles in an event with a plurality of cameras and recognizing at least one object moving in said video images;
a display function for displaying said plurality of video images so that at least one of said objects recognized by said object recognizing function is selectable, and if receiving a selection of an object, displaying one of said video images
including an attention object, to which a user pays attention, as a tracking video prior to other video images;
a frame-out detecting function for detecting frame-out of said attention object out of said tracking video; and
a video searching function for searching other video images using said attention object as a searching key if said frame-out of said attention object is detected, and allowing said display apparatus to display one of said video images searched as said tracking video.

17. The non-transitory computer readable medium as claimed in claim 16, wherein said object recognizing function is also for receiving the plurality of video images through a plurality of video channels.

18. The non-transitory computer readable medium as claimed in claim 16, wherein said computer-readable instructions allow said display apparatus to further realize a video preserving function for receiving the plurality of video images through a plurality of video channels and preserving the plurality of video images.

19. The apparatus of claim 1, wherein frame-out of the attention object occurs when the attention object is completely not visible in the tracking video.

* * * * *